United States Patent [19]

Heller

[11] 3,850,700

[45] Nov. 26, 1974

[54] METHOD AND MATERIALS FOR COATING METAL SURFACES

[75] Inventor: Ferdinand P. Heller, Philadelphia, Pa.

[73] Assignee: Amchem Products, Inc., Ambler, Pa.

[22] Filed: Oct. 18, 1971

[21] Appl. No.: 190,409

[52] U.S. Cl. ............................................ 148/6.15 Z
[51] Int. Cl. ................................................ C23f 7/08
[58] Field of Search .................. 148/6.15 Z, 6.15 R

[56] References Cited
UNITED STATES PATENTS

| 3,200,004 | 8/1965 | Herbst et al. | 148/6.15 Z |
| 3,333,988 | 8/1967 | Douty et al. | 148/6.15 |
| 3,617,393 | 11/1971 | Nakazawa | 148/6.15 Z |
| 3,676,224 | 7/1972 | Snee | 148/6.15 |

Primary Examiner—Douglas J. Drummond
Assistant Examiner—M. G. Wityshyn
Attorney, Agent, or Firm—Synnestvedt & Lechner

[57] ABSTRACT

Zinc phosphate coating solution accelerated with both chlorate and nitrite, and containing fluoride give enhanced corrosion resistance and paint adhesion on steel and galvanized surfaces, particularly passivated galvanized surfaces. Results are further enhanced when the coated surfaces are baked at 300°F to 400°F for 2 to 10 minutes prior to application of electrophoretic paint.

7 Claims, No Drawings

METHOD AND MATERIALS FOR COATING METAL SURFACES

This invention relates to methods and materials for finishing metal surfaces, including in certain of its aspects, preparation of the surfaces for painting by enhancing their corrosion resistant and paint bonding properties, and including in other of its aspects, the preparation of a completed painted surface. The metals with which the invention is concerned are iron, steel, and zinciferous surfaces, including zinc and various types of galvanized steel.

Zinc phosphate coatings have long been employed on both iron and zinc to enhance their paint adhesion properties and resistance to corrosion. The coatings have been formed by contacting the surfaces with aqueous acidic solutions containing zinc ion and phosphate ion together with other materials. Among the other materials which have been used in the solutions are accelerators such as nitrate, nitrite (or a mixture of nitrite and nitrate), chlorate, and various peroxides. Until relatively recently it has been the practice to use either a nitrite accelerator or a chlorate accelerator, but U.S. Pat. No. 3,333,988, teaches that improved results are obtained if both chlorate and nitrite are used in zinc phosphate coating baths. In accordance with the art various other anions have been employed in zinc phosphate coating solutions, and among these in fluoride, in both its simple and complex forms. It has been used in such solutions for various purposes. For example, U.S. Pat. 2,487,137 teaches that fluoride acts as an accelerator when used in a nitrate accelerated zinc phosphating solution. U.S. Pat. 3,454,483 teaches that defects thought to be caused by chromate final rinses on surfaces which are later painted by the electrophoretic method can be avoided by employing simple fluoride in solutions accelerated by nitrate and/or nitrite. British Pat. No. 1,214,607 teaches that chlorate accelerated coating solutions may be operated at much lower temperature if fluoride is included in them. Other phosphating solutions employing fluoride or complex fluoride as a component are disclosed in U.S. Pat. Nos. 3,101,286; 3,109,757; and 3,297,494.

Although the art of zinc phosphate coating of iron and zinc is well developed, several problem areas remain. One of these is that certain kinds of galvanized steel are difficult to coat. Some of the difficulties are thought to be traceable to metals other than zinc in the galvanized surface, which metals interfere with the phosphating process. Another source of difficulty with galvanized steel is the passivation process which is often applied to prevent formation of white rust. Passivated galvanized surfaces have on them a film which is very stable and which resists the formation of a zinc phosphate coating.

Another problem area involving zinc phosphate coatings results from the development of an increasing use of the technique of electrophoretic painting. In this technique a resinous paint is applied to a metal surface by immersing the surface in a water based dilute paint bath, charging the surface electrically (usually positively), charging the paint tank electrically (usually negatively), and utilizing the current passing through the bath to transport the resin of the paint to the metallic surface and to form a film there. It has been found that the conventional zinc phosphating methods which were developed for and worked well with non-electrophoretic paint systems do not always work well when used as a pretreatment on metal which is electrophoretically painted.

The evolution of manufacturing processes has caused a conjunction of the foregoing and other problems in an increasing number of situations. For example, the use of galvanized steel panels as parts of automobile bodies for improved durability is increasing, as is the use of electrophoretic painting to apply the primer coat to the assembled bodies. Thus there is a need for zinc phosphate coating methods and solutions which are capable of applying good quality coatings to both galvanized steel and steel at the same time and in the same equipment, and to do so in a manner which will produce substantially the same corrosion resistance and paint adhesion properties on the galvanized and steel parts of the body, when the body is electrophoretically painted.

In accordance with the present invention methods and solutions for zinc phosphate coating are provided which overcome the problems just outlined by utilizing a coating bath which is accelerated by both chlorate and nitrite, and which contains fluoride. In accordance with another aspect of the invention, a phosphate coating, after application of a dilute acidic passivating rinse, is baked at an elevated temperature prior to being electrophoretically painted, thereby producing, upon painting, surfaces having improved corrosion resistance and paint adhesion properties, which properties are substantially the same whether the metal be steel or galvanized steel.

The improved results produced in accordance with the invention are preferably obtained by utilizing concentrations of chlorate ion and nitrite ion in the phosphate coating bath in accordance with the teachings of above mentioned U.S. Pat. No. 3,333,988. Thus it is preferred that nitrite concentration be maintained between about 0.03 and about 1.0 g/l of nitrite ion, expressed as $NO_2$. For optimum economy between about 0.07 and 0.11 g/l of nitrite is preferred. The concentration of the chlorate accelerator should be between about 0.2 g/l and about 2 g/l for optimum results.

The fluoride component of the solutions of the invention is preferably provided in the form of a simple fluoride, although bifluorides and complex fluorides may be employed if desired. The baths should contain from about 0.01 g/l to about 5 g/l of fluoride, calculated as F and preferably between about 0.1 and about 1 g/l to obtain optimum results. If complex fluorides are used, greater amounts should be employed to take into account the fact such compounds do not completely dissociate.

The principal coating forming ingredients in the solutions of the invention are zinc ion and phosphate ion. It is preferred that zinc phosphate be present in the bath in a concentration between about 0.5 g/l and about 5 g/l. The zinc phosphate solution may conveniently be formed by reacting zinc oxide with phosphoric acid in the course of preparing a concentrate for dilution with water to form a bath. It is preferred that nickel ion be included in the solutions of the invention for its known function of improving coating quality on galvanized surfaces. In addition, it is preferred that an iron salt be included in the solutions to provide increased stability.

Formula I is a preferred formulation for forming a concentrate useful in the practice of the invention.

FORMULA I

| | % by weight |
|---|---|
| Zinc Oxide | 12.7 |
| 75% phosphoric acid | 51.5 |
| Sodium chlorate | 6.4 |
| Nickelous oxide (75% Nl) | 0.6 |
| Ferric chloride hexahydrate | 0.3 |
| 70% hydrofluoric acid | 1.3 |
| Water | balance |

The nitrite component is not included in the concentrate of Formula I because it is not stable in the presence of the other components for extended periods such as those encountered in storage and shipment. The concentrate of Formula I is preferably diluted for use to a 1 percent (volume/volume) solution. Sufficient nitrite is added to establish the before-mentioned concentration of from about 0.03 and about 1.0 g/l of nitrite. The pH of the diluted solution is adjusted to about 3.0 from about 2.0 by the use of caustic soda. The bath when so prepared is contacted with the metal surfaces to be treated, after they have been cleaned in a conventional manner, at a temperature between about 115°F and about 145°F. The method by which the coating producing contact may be brought about is any of the conventionally used methods, e.g. spraying, dipping, brushing, flooding, etc. The contact time between the solution and the surface is similar to that encountered with other phosphate coating solutions. For example, when the spray process is used a contact time of about 1 minute is about adequate.

After treatment, the coated surface is rinsed with water and then is treated with an acidulated passivating rinse and then is dried prior to application of paint.

As pointed out above, in accordance with one aspect of the invention the coated and rinsed surfaces are baked for a short period of time at an elevated temperature prior to the application of an electrophoretic paint. This step improves the paint adhesion and corrosion resistance properties of the coated surface materially for both zinc surfaces and steel surfaces, and as it improves the coating quality on each type of surface, the performance of the coating on both steel and galvanized surfaces becomes substantially the same. The baked surfaces are then electrophoretically painted to produce a finished surface.

The reasons that the inclusion of a baking step in combination with the step of forming coatings with the particular formulations of the present invention produces a superior result are not fully understood, but it is thought that the elevated baking temperature drives off water of crystallization in the zinc phosphate coating resulting in a crystal structure more impervious to corrosive attack. It has been noted that the baking of surfaces coated with somewhat similar solutions to those of the invention, including those containing all ingredients except chlorate and those containing all ingredients except fluoride, does not produce the same improvement of paint adhesion and corrosion resistance. For example, baking of a coating produced from the solution substantially similar to a dilution of Formula I, but without chlorate, produces a material improvement in such properties on steel but not on galvanized steel. Similarly, the baking of a coating produced by a solution substantially the same as a dilution of Formula I, but without fluoride, produces some improvement on steel, but no improvement whatever, and in some cases even worse results, on galvanized steel.

The baking step preferably comprises subjecting the coated and rinsed surfaces to a temperature of from about 300°F to about 400°F for a short period, for example between about 2 minutes and about 10 minutes. Preferably, the surfaces are subjected to an oven temperature of about 350°F for about 5 minutes.

The foregoing considerations are illustrated by the following example. Steel and galvanized steel panels were treated in a 1 percent solution of Formula I, after being conventionally cleaned, and after treatment were rinsed in an acidulated passivating rinse. For comparison, other steel and galvanized steel panels were treated in a 1 percent solution of Formula II below, which is much like Formula I except for the omission of fluoride, and which generally follows the teachings of U.S. Pat. No. 3,333,988.

Formula II

| | % by weight |
|---|---|
| Zinc oxide | 12.5 |
| 75% phosphoric acid | 58.1 |
| Nickelous oxide 75% Nl | 1.2 |
| Ferric chloride hexahydrate | 0.2 |
| Sodium chlorate | 3.9 |
| water | balance |

Sufficient nitrite was added to the diluted bath of Formula II to establish a concentration between about 0.03 g/l and about 1.0 g/l. The panels treated with the diluted bath of Formula II were also conventionally cleaned prior to treatment and treated with an acidulated passivating rinse following treatment.

For additional comparative purposes, steel and galvanized steel panels were treated, after cleaning, in a 1% solution of Formula III, which formula is much like Formula I except that no chlorate is present.

Formula III

| | % by weight |
|---|---|
| Zinc oxide | 11.1 |
| 75% phosphoric acid | 35.3 |
| Nickelous oxide (75% Nl) | 2.7 |
| Nitric acid (38° Baume') | 12.5 |
| 70% hydrofluoric acid | 1.3 |
| 49% fluoboric acid | 3.2 |
| Ferrous phosphate | 0.7 |
| Water | balance |

Sufficient nitrite was added to the solution of Formula III to establish a concentration between about 0.03 g/l and about 1.0 g/l. After coating, the panels treated with a dilution of Formula III were also rinsed with an acidulated passivating rinse.

The panels treated with Formulas I, II, and III, were divided into two groups. One group was air dried. The other was baked in an oven for 5 minutes at 350°F. All of the panels were than electrophoretically painted. Two different types of electrophoretic paint were employed, one being a potassium hydroxide system supplied by Pittsburgh Plate Glass Company under the designation ED 1128, and the other being an amine deficient system supplied by the Mobil Corporation under the designation MOBIL 174-1. The painted panels were then scribed and then subjected to a conventional salt spray test for 336 hours to determine under paint corrosion resistance and paint adhesion in the presence of a corrosive atmosphere. The results are presented in Table 1. The fractional numbers reported in Table I are measures of paint loss on both sides of the scribe mark in 30 seconds of an inch. A small paint loss in these terms is an indication of good underpaint corrosion resistance properties and good paint adhesion properties in the presence of a corrosive atmosphere.

Table 1

|  | Formula I | Formula II | Formula III |
|---|---|---|---|
| KOH System | | | |
| Steel | | | |
| Air Dried | 1" | 6/32" | 1" |
| Baked | 2/32" | 1/32" | 3/32" |
| Galvanized Steel | | | |
| Air Dried | 3/32" | 80% paint loss | 12/32" |
| Baked | 3/32" | 80% paint loss | 12/32" |
| Amine Deficient System | | | |
| Steel | | | |
| Air Dried | 2/32" | 2/32" | 2/32" |
| Baked | trace | 1/32" | trace |
| Galvanized Steel | | | |
| Air Dried | 6/32" | 75% paint loss | 10/32" |
| Baked | 5/32" | 75% paint loss | 7/32" |

From Table 1 it can be seen that when steel and galvanized surfaces are treated with a solution of the invention (Formula I) and are thereafter baked and electrophoretically painted, their corrosion resistance and paint adhesion properties, as measured by salt spray testing, are substantially the same and are very good. By contrast, closely similar solutions, such as formulas II and III, even when subjected to the baking step, do not produce such uniformity of high quality performance. Formula II is generally good on steel but poor on galvanized; Formula III is generally good on steel but only fair on galvanized steel.

What is claimed is:

1. A method for finishing articles having both steel and galvanized surfaces comprising applying a zinc phosphate coating to said surfaces by contacting them with a zinc phosphating solution containing from about 0.2 to about 2.0 grams/liter chlorate, from about 0.03 to about 1.0 grams/liter nitrite calculated as $NO_2$, and from about 0.01 to about 5.0 grams/liter fluoride, calculated as F, rinsing said coated surfaces with a dilute acidulated rinse, thereafter baking said coated and rinsed surfaces at a temperature between about 300°F and about 400°F for about 2 to about 10 minutes, and thereafter applying a paint to said surfaces electrophoretically.

2. A method according to claim 1 wherein the concentration of said fluoride is from about 0.1 to about 1.0 grams/liter.

3. A method according to claim 1 wherein said coated and rinsed surfaces are baked at a temperature of about 350°F for about 5 minutes.

4. A method for finishing articles having both steel and galvanized surfaces comprising applying a zinc phosphate coating to said surfaces by contacting them with a zinc phosphating solution containing from about 0.2 to about 2.0 grams/liter chlorate, from about 0.03 to about 1.0 grams/liter nitrite calculated as $NO_2$, and from about 0.01 to about 5.0 grams/liter fluoride, calculated as F, rinsing said coated surfaces with a dilute acidulated rinse, and thereafter applying a paint to said surfaces electrophoretically.

5. A method according to claim 4 wherein the concentration of said fluoride is from about 0.1 to about 1.0 grams/liter.

6. A method for applying a protective coating to articles having both ferriferous and zinciferous surfaces comprising contacting said surfaces with a zinc phosphating solution containing from about 0.2 to about 2.0 grams/liter chlorate, from about 0.03 to about 1.0 grams/liter nitrite calculated as $NO_2$, and from about 0.01 to about 5.0 grams/liter fluoride, calculated as F, and rinsing said coated surfaces with a dilute acidulated rinse.

7. A method according to claim 6 wherein the concentration of said fluoride is from about 0.1 to about 1.0 grams/liter.

* * * * *